(12) United States Patent
Kogami et al.

(10) Patent No.: US 12,424,698 B2
(45) Date of Patent: Sep. 23, 2025

(54) POWER SUPPLY DEVICE, ELECTRIC VEHICLE COMPRISING POWER SUPPLY DEVICE, AND POWER STORAGE DEVICE

(71) Applicant: SANYO Electric Co., Ltd., Osaka (JP)

(72) Inventors: Nao Kogami, Hyogo (JP); Kazuhiro Harazuka, Hyogo (JP); Koji Fujinaga, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 568 days.

(21) Appl. No.: 17/906,623

(22) PCT Filed: Dec. 28, 2020

(86) PCT No.: PCT/JP2020/049215
§ 371 (c)(1),
(2) Date: Sep. 18, 2022

(87) PCT Pub. No.: WO2021/199545
PCT Pub. Date: Oct. 7, 2021

(65) Prior Publication Data
US 2023/0163402 A1 May 25, 2023

(30) Foreign Application Priority Data
Mar. 31, 2020 (JP) ................. 2020-063976

(51) Int. Cl.
*H01M 50/291* (2021.01)
*B60K 1/04* (2019.01)
(Continued)

(52) U.S. Cl.
CPC ............ *H01M 50/293* (2021.01); *B60K 1/04* (2013.01); *B60L 50/64* (2019.02);
(Continued)

(58) Field of Classification Search
CPC ............ H01M 50/209; H01M 50/242; H01M 50/264; H01M 50/291; H01M 50/293
See application file for complete search history.

(56) References Cited

U.S. PATENT DOCUMENTS

2009/0111010 A1  4/2009  Okada et al.
2021/0367290 A1  11/2021  Kasai et al.

FOREIGN PATENT DOCUMENTS

CN    102593390 A    7/2012
CN    206059484      3/2017
(Continued)

OTHER PUBLICATIONS

International Search Report of PCT application No. PCT/JP2020/049215 dated Feb. 22, 2021.
(Continued)

*Primary Examiner* — Kevin E Yoon
(74) *Attorney, Agent, or Firm* — WHDA, LLP

(57) ABSTRACT

A power supply device includes: battery block formed by stacking a plurality of battery cells in a thickness with separator interposed therebetween; a pair of end plates disposed on both end surfaces of battery block; and binding bar that is coupled to the pair of end plates and fixes battery block in a pressurized state via end plates. Separator is an elastomer, and both surfaces of plate-shaped part are formed into uneven layers having different amounts of change in thickness with respect to a pressing force.

8 Claims, 14 Drawing Sheets

(51) Int. Cl.
*B60L 50/64* (2019.01)
*H01M 50/209* (2021.01)
*H01M 50/242* (2021.01)
*H01M 50/264* (2021.01)
*H01M 50/293* (2021.01)

(52) U.S. Cl.
CPC ....... *H01M 50/209* (2021.01); *H01M 50/242* (2021.01); *H01M 50/264* (2021.01); *H01M 50/291* (2021.01)

(56) References Cited

FOREIGN PATENT DOCUMENTS

| | | |
|---|---|---|
| EP | 2472633 A1 | 7/2012 |
| JP | 2012-238603 | 12/2012 |
| JP | 2014-010939 A | 1/2014 |
| JP | 2018-204708 | 12/2018 |
| JP | 2020-043005 A | 3/2020 |
| KR | 100684766 B1 * | 2/2007 |
| WO | 2019/171575 | 9/2019 |
| WO | 2020/004039 A1 | 1/2020 |

OTHER PUBLICATIONS

Extended (Supplementary) European Search Report dated Feb. 27, 2024, issued in counterpart EP Application No. 20928722.6. (10 pages).

English Translation of Chinese Search Report dated May 10, 2024, issued in counterpart CN application No. 202080094776.8. (3 pages).

* cited by examiner

POWER SUPPLY DEVICE, ELECTRIC VEHICLE COMPRISING POWER SUPPLY DEVICE, AND POWER STORAGE DEVICE

TECHNICAL FIELD

The present invention relates to a power supply device in which a large number of battery cells are stacked, and an electric vehicle and a power storage device equipped with the power supply device.

BACKGROUND ART

A power supply device in which a large number of battery cells are stacked is suitable as a power source that is mounted on an electric vehicle and supplies electric power to a motor that causes the vehicle to travel, a power source that is charged with a natural energy such as a solar battery or midnight electric power, and a backup power source in the event of a power failure. In the power supply device having this structure, a separator is sandwiched between the stacked battery cells. The power supply device in which a large number of battery cells are stacked with a separator interposed therebetween fixes the stacked battery cells in a pressurized state in order to prevent positional displacement due to expansion of the battery cells. In order to realize this, in the power supply device, a pair of end plates are disposed on both end surfaces of a battery block in which the large number of battery cells are stacked, and the pair of end plates are connected by binding bars. (See PTL 1.)

CITATION LIST

Patent Literature

PTL 1: Unexamined Japanese Patent Publication No. 2018-204708

SUMMARY OF THE INVENTION

In the power supply device, the plurality of battery cells are stacked to form the battery block, the pair of end plates are disposed on both end surfaces of the battery block, and the battery block is held in a pressurized state by a considerably strong pressure from both the end surfaces, and the pair of end plates are connected by the binding bars. In the power supply device, the battery cells are fixed in a strongly pressurized state to prevent malfunction due to relative movement or vibration of the battery cells. When the power supply device uses, for example, a battery cell with a stacked surface having an area of about 100 $cm^2$, the end plates are pressed with a strong force of several tons and fixed with the binding bars. In the power supply device having this structure, a plate-shaped insulating plastic plate is used as the separator in order to insulate the adjacently stacked battery cells with the separator. The separator of the plastic plate cannot absorb the expansion of the battery cells in a state where an internal pressure of each of the battery cells increases and expands, and in this state, a surface pressure between the battery cell and the separator rapidly increases, and an extremely strong force acts on the end plates and the binding bars. For this reason, the end plates and the binding bars are required to have a very strong material and shape, and there is an adverse effect that the power supply device becomes heavy and large, and the material cost increases.

The present invention has been developed to solve the above disadvantages, and an object of the present invention is to provide a technique for absorbing the expansion of battery cells by a separator.

A power supply device according to an aspect of the present invention includes: a battery block formed by stacking a plurality of battery cells in a thickness with a separator interposed between the battery cells; a pair of end plates disposed on both end surfaces of the battery block; and a binding bar that is coupled to the pair of end plates and fixes the battery block in a pressurized state via the end plates. The separator is an elastomer, and both surfaces of a plate-shaped part are formed into uneven layers including different amounts of change in thickness with respect to a pressing force.

An electric vehicle according to an aspect of the present invention includes: the above-described the power supply device; a motor for traveling to which electric power is supplied from the power supply device; a vehicle body on which the power supply device and the motor are mounted; and wheels driven by the motor to cause the vehicle body to travel.

A power storage device according to an aspect of the present invention includes: the above-described power supply device; and a power supply controller that controls charging and discharging to the power supply device, wherein the power supply controller enables charging to the battery cells by electric power from an outside, and performs control to charge the battery cells.

In the power supply device described above, parallel ridges of the separator locally press an electrode layer of the battery cells to suppress degradation of the battery due to a decrease in fluidity of an electrolyte solution.

DESCRIPTION OF EMBODIMENT

Figure 1:
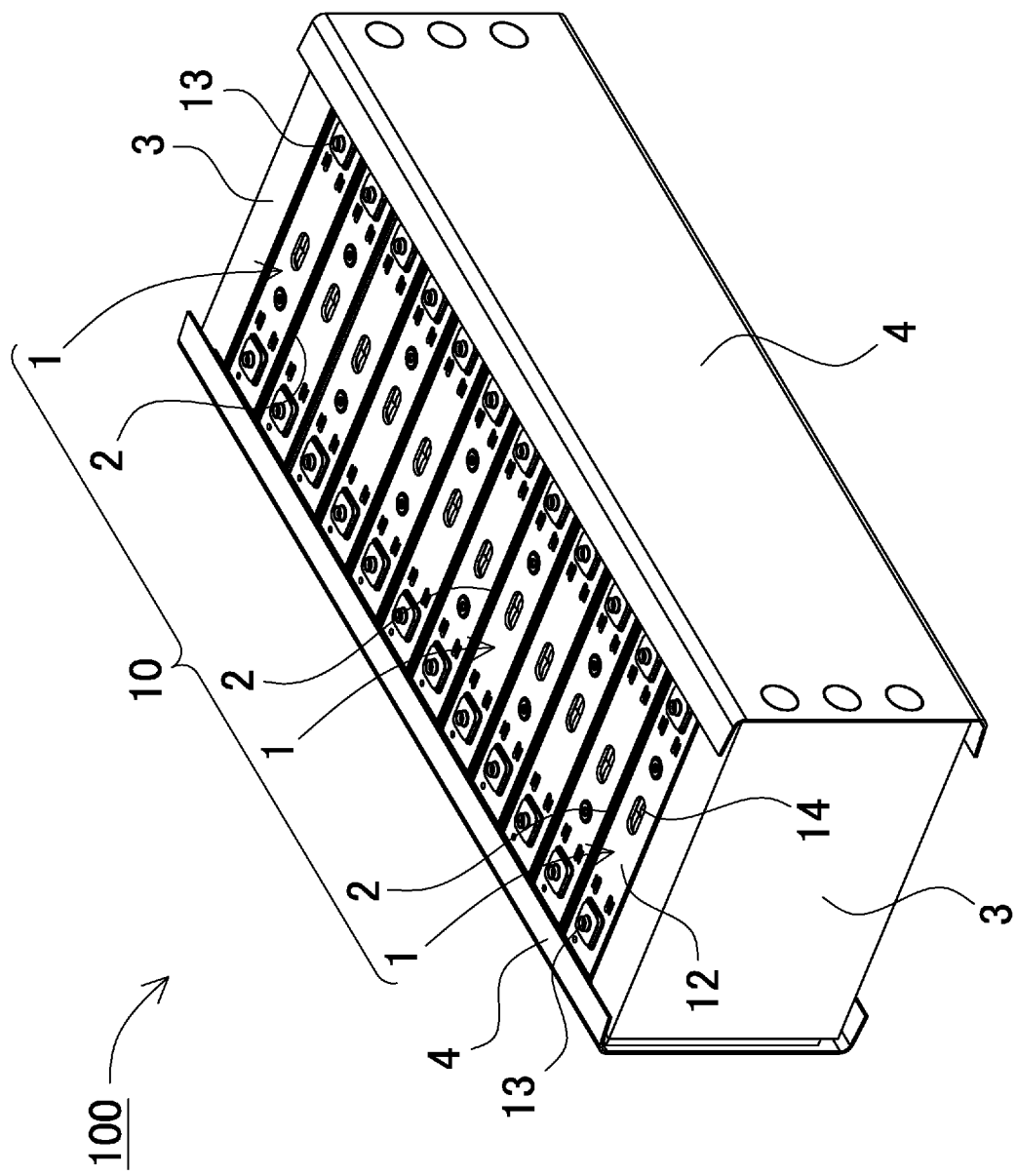
FIG. 1 is a perspective view of a power supply device according to an exemplary embodiment of the present invention.

Hereinafter, the present invention will be described in detail with reference to the drawings. Note that, in the following description, terms (e.g., "top", "bottom", and other terms including those terms) indicating specific directions or positions are used as necessary; however, the use of those terms is for facilitating the understanding of the invention with reference to the drawings, and the technical scope of the present invention is not limited by the meanings of the terms. Further, parts denoted by the same reference marks in a plurality of drawings indicate the same or equivalent parts or members.

Furthermore, exemplary embodiments to be described below show a specific example of the technical idea of the present invention, and the present invention is not limited to the exemplary embodiments below. Further, unless otherwise specified, dimensions, materials, shapes, relative dispositions, and the like of the configuration components described below are not intended to limit the scope of the present invention only to them, but are intended to be illustrative. Furthermore, the contents described in one exemplary embodiment or example are also applicable to other exemplary embodiments and examples. Additionally, sizes, positional relationships, and the like of members illustrated in the drawings may be exaggerated for clarity of description.

A power supply device according to a first exemplary embodiment of the present invention includes a battery block formed by stacking a plurality of battery cells in a thickness with a separator interposed therebetween, a pair of end plates disposed on both end surfaces of the battery block, and a binding bar that is coupled to the pair of end plates and fixes the battery block in a pressurized state via the end plates. The separator is an elastomer, and both surfaces of a plate-shaped part are formed into uneven layers including different amounts of change in thickness with respect to a pressing force.

In the separator of the power supply device described above, since the uneven layers having different amounts of change in thickness with respect to the pressing force, that is, an uneven layer that is flexibly changed by being pressed by the battery cell and an uneven layer having a small amount of change are provided on both surfaces, in a region where the expansion of the battery cell is small, the flexible uneven layer that is easily deformed absorbs the expansion, in a state where the expansion of the battery cell is large and the flexible uneven layer is crushed and cannot absorb the expansion, the uneven layer that is hardly deformed absorbs the expansion, and further, in a state where the uneven layer that is hardly deformed due to the expansion of the battery cell is also crushed and cannot absorb the expansion, the plate-shaped part is thinly deformed and absorbs the expansion of the battery cell. When the uneven layer is crushed and further pressurized, the plate-shaped part of the separator is thinly deformed and absorbs expansion of the battery cell. The plate-shaped part of the elastomer is less likely to be deformed than the uneven layer, and the uneven layer is elastically deformed by a strong pressing force exceeding an elastic limit to further absorb expansion of the battery cell. For this reason, in the separator in which the uneven layers having different amounts of change in thickness with respect to the pressing force are provided on both surfaces of the plate-shaped part, small expansion of the battery cell is absorbed by the uneven layer which is easily deformed, and larger expansion is absorbed by the uneven layer which is less likely to be deformed, and further larger expansion is absorbed by the plate-shaped part being crushed thinly. Therefore, in the separator described above, the uneven layer absorbs the small expansion of the battery cell having a high occurrence frequency, the plate-shaped part absorbs the large expansion, and the uneven layer that is less likely to deform absorbs the intermediate expansion between the small expansion and the large expansion of the battery cell, so that there is an advantage that the small expansion to the large expansion of the battery cell can be absorbed in an ideal state. Further, an effect that dimensional tolerances of the battery cell and the separator can be absorbed by the uneven layer which is easily deformed can also be expected.

Furthermore, in the power supply device described above, the uneven layers having different deformation amounts are provided on both surfaces of the plate-shaped part of the elastomer, and the three elastically deformable layers having different deformation amounts with respect to the pressing force suppress the increase in surface pressure due to the expansion of the battery cell, so that the stress acting on the end plates and the binding bar can be alleviated while the battery cell efficiently absorbs the expansion. The uneven layer can efficiently absorb the initial expansion of the battery cell, but when the expansion of the battery cell becomes large and exceeds the elastic limit, the uneven layer cannot be elastically deformed, and causes the stress of the end plates and the binding bar to be rapidly increased. However, in a region where the uneven layer exceeds the elastic limit, the plate-shaped part of the elastomer is elastically deformed to suppress an increase in the stress of the end plates and the binding bar. Therefore, it is possible to suppress the maximum stress acting on the end plates and the binding bar while effectively absorbing the expansion of the battery cell. In the power supply device capable of suppressing the maximum stress acting on the end plates and the binding bar, the weight can be reduced by thinning the end plates and the binding bar.

Further, the power supply device in which the three elastic deformation layers including the uneven layers on both surfaces and the plate-shaped part effectively absorb expansion of the battery cell can prevent relative positional displacement of the battery cell due to the expansion of the battery cell. This can also prevent adverse effects of an electrical connection part of the battery cell. This is because, although the stacked battery cells are electrically connected by fixing a bus bar of a metal sheet to an electrode terminal, when the battery cells are misaligned relatively to each other, an excessive stress acts on the bus bar and the electrode terminal, which causes a failure.

In a power supply device according to a second exemplary embodiment of the present invention, the elastomer of the separator is made of a synthetic rubber.

In a power supply device according to a third exemplary embodiment of the present invention, the synthetic rubber of the elastomer is any of a fluororubber, an isoprene rubber, a styrene butadiene rubber, a butadiene rubber, a chloropron rubber, a nitrile rubber, a hydrogenated nitrile rubber, a folylisobutylene rubber, an ethylene propylene rubber, an ethylene-vinyl acetate copolymer rubber, a chlorosulfonated polyethylene rubber, an acrylic rubber, an epichlorohydrin rubber, a urethane rubber, a silicone rubber, a thermoplastic olefin rubber, an ethylene propylene diene rubber, a butyl rubber, and a polyether rubber.

In a power supply device according to a fourth exemplary embodiment of the present invention, the separator includes the uneven layers by providing a plurality of protrusions on the surfaces of the plate-shaped part.

In a power supply device according to a fifth exemplary embodiment of the present invention, the uneven layers including different amounts of change in thickness with respect to the pressing force of the battery cells are formed by providing protrusions including different shapes on both surfaces of the plate-shaped part.

In a power supply device according to a sixth exemplary embodiment of the present invention, the protrusions including different contact areas with the battery cells in an uncompressed state are provided on both surfaces of the plate-shaped part.

In a power supply device according to a seventh exemplary embodiment of the present invention, the uneven layers include, from a contact part with the battery cells toward the plate-shaped part, the protrusions including a larger cross-sectional area in a plane parallel to a surface of the plate-shaped part.

In a power supply device according to an eighth exemplary embodiment of the present invention, the protrusions are elongated ridges, and a plurality of rows of the ridges are provided on the surfaces of the plate-shaped part.

In a power supply device according to a ninth exemplary embodiment of the present invention, the plurality of rows of ridges include parallel ridges arranged in parallel with each other, and the uneven layers are formed by alternately arranging a plurality of rows of the parallel ridges and a plurality of rows of parallel grooves.

In the power supply device described above, the parallel ridges of the separator locally press the electrode layer of the battery cell to improve the fluidity of the electrolyte solution. The reason why the comb-teeth-shaped separator in which the parallel ridges and the parallel grooves are alternately provided on the surface facing the battery cell can improve the fluidity of the electrolyte solution is that the electrode has a high density in a region pressed by the parallel ridges, but the electrode has a low density in a region facing the parallel grooves not pressed by the parallel ridges, so that the electrolyte solution easily moves.

In a power supply device according to a tenth exemplary embodiment of the present invention, in a first uneven layer of the plate-shaped part, the parallel ridges each including a rectangular cross-sectional shape are provided, in a second uneven layer of the plate-shaped part, the parallel ridges each including a lateral width gradually narrowed toward a battery cell connection surface are provided, and on both the surfaces of the plate-shaped part, the uneven layers including different amounts of change in thickness with respect to a pressing force are provided.

Note that, in the present specification, the cross section of the parallel ridges means a cross section in a cut surface orthogonal to a longitudinal direction of the parallel ridges.

In a power supply device according to an eleventh exemplary embodiment of the present invention, in the second uneven layer of the plate-shaped part, the parallel ridges including a cross-sectional shape of any of a triangular shape, an arch shape, and a trapezoidal shape are provided.

First Exemplary Embodiment

Figure 2:
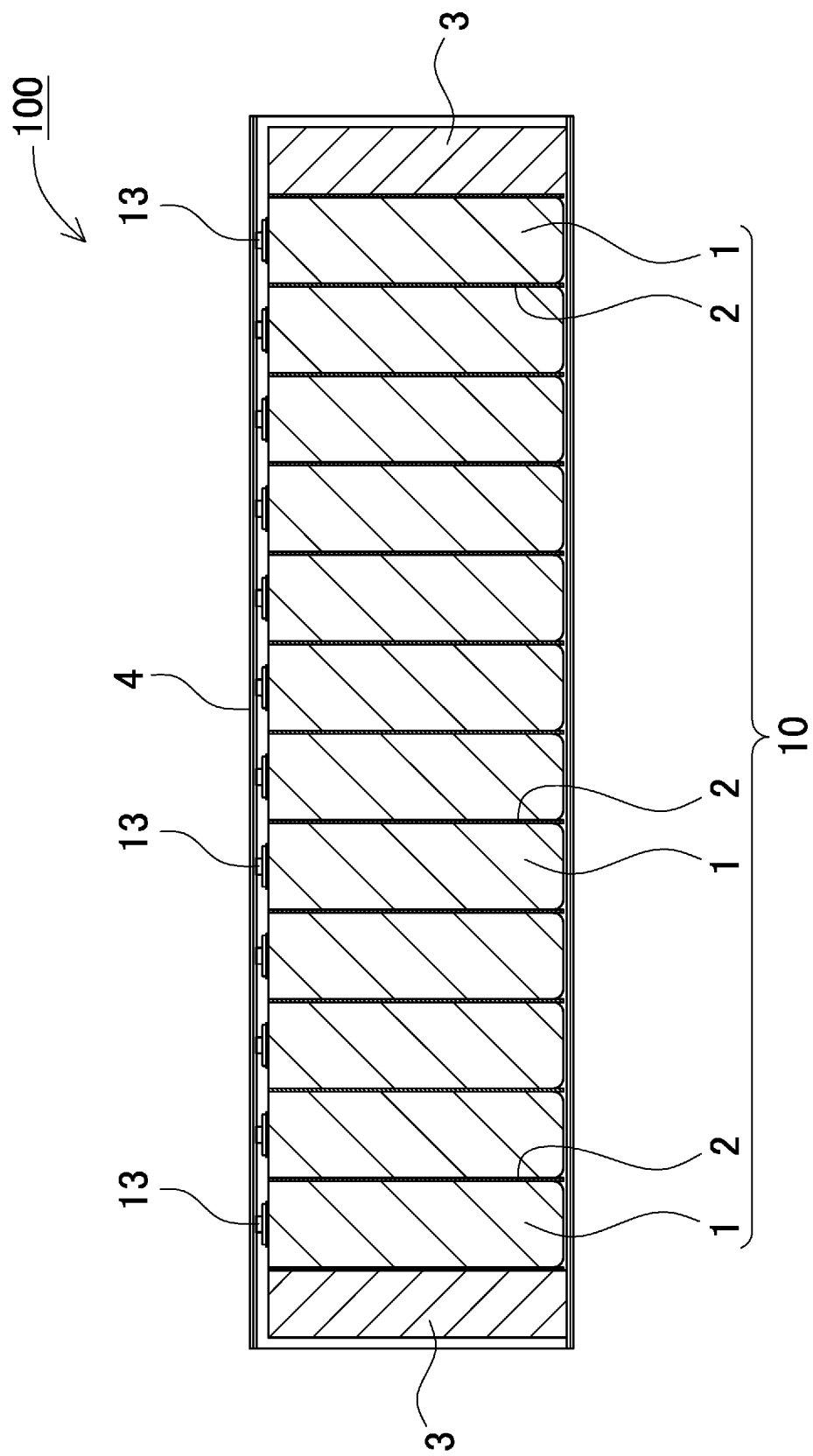
FIG. 2 is a vertical cross-sectional view of the power supply device illustrated in FIG. 1.
Figure 3:
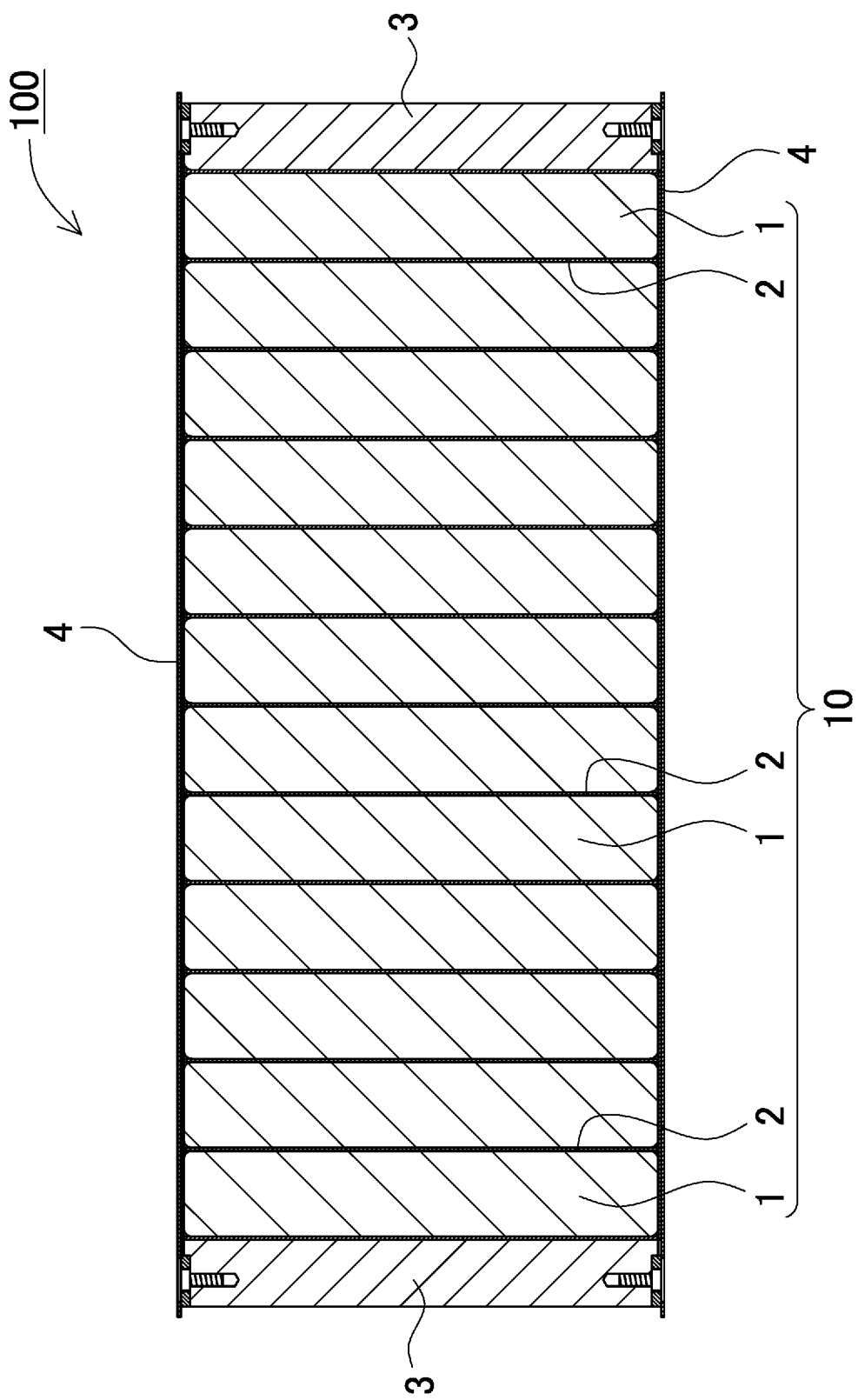
FIG. 3 is a horizontal cross-sectional view of the power supply device illustrated in FIG. 1.

Power supply device 100 illustrated in a perspective view of FIG. 1, a vertical cross-sectional view of FIG. 2, and a horizontal cross-sectional view of FIG. 3 includes battery block 10 in which a plurality of battery cells 1 are stacked in a thickness with separator 2 interposed between battery cells 1, a pair of end plates 3 disposed on both end surfaces of battery block 10, and binding bar 4 that is coupled to the pair of end plates 3 and fixes battery block 10 in a pressurized state via end plates 3.

Battery Block 10

In battery block 10, a plurality of battery cells 1, which are prismatic battery cells having a quadrangular outer shape, are stacked in a thickness with separator 2 interposed therebetween. The plurality of battery cells 1 are stacked such that top surfaces thereof are flush with each other to constitute battery block 10.

Battery Cell 1

Figure 4:
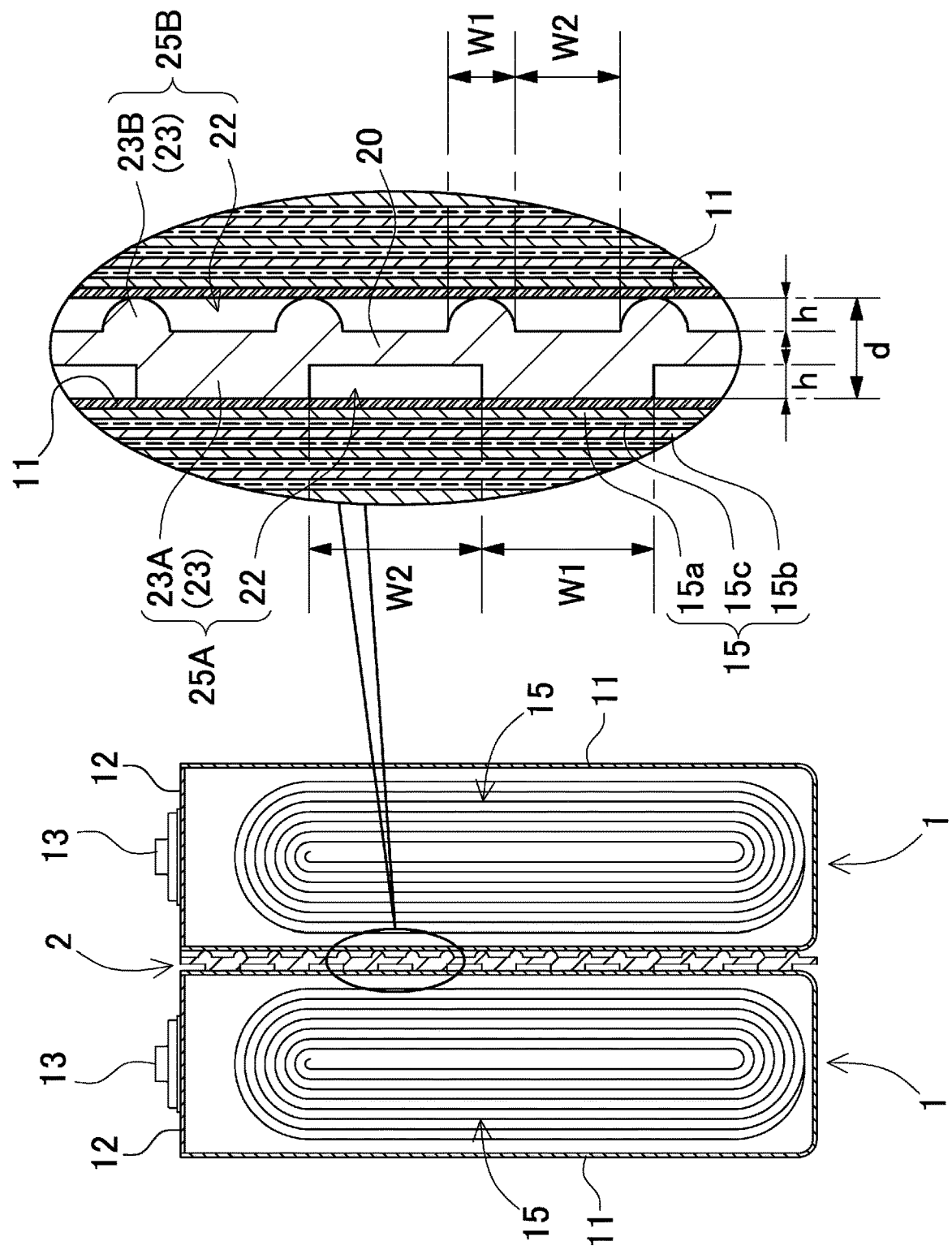
FIG. 4 is a partially enlarged cross-sectional view illustrating a stacked structure of battery cells and a separator.

As illustrated in FIG. 4, in battery cell 1, electrode 15 is inserted into battery case 11 whose bottom is closed, and sealing plate 12 is hermetically fixed by laser welding to an upper end opening, so that the inside has a sealed structure. Further, the inside of battery case 11 is filled with an electrolyte solution (not illustrated). As illustrated in FIG. 1, sealing plate 12 is provided with a pair of positive and negative electrode terminals 13 protruding upward at both end parts of the top surface. Safety valve 14 is provided between electrode terminals 13. Safety valve 14 opens to release internal gas when an internal pressure of battery cell 1 rises to more than or equal to a predetermined value. Safety valve 14 prevents a rise in internal pressure of battery cell 1.

Battery cell 1 is a lithium ion secondary battery. Power supply device 100 provided with a lithium ion secondary battery serving as battery cell 1 has an advantage in that a charging capacity per volume and weight can be increased. However, battery cell 1 may be any other chargeable battery such as a non-aqueous electrolyte secondary battery other than the lithium ion secondary battery.

End Plate 3, Binding Bar 4

Each of end plates 3 is a metal sheet substantially coinciding in outer shape with battery cell 1 and is not deformed by being pressed by battery block 10, and binding bars 4 are connected to both side edges of end plate 3. End plates 3 connect stacked battery cells 1 in a pressurized state, and binding bars 4 fix battery block 10 in the pressurized state at a predetermined pressure.

Separator 2

Separator 2 is sandwiched between stacked battery cells 1, absorbs expansion of battery cells 1 due to an increase in internal pressure, and further insulates adjacent battery cells 1. Battery block 10 includes bus bars (not illustrated) fixed to electrode terminals 13 of adjacent battery cells 1 to connect battery cells 1 in series or in parallel. Since a potential difference is generated between the battery cases, battery cells 1 connected in series are insulated by separator 2 and stacked. Although battery cells 1 connected in parallel cause no potential difference to be generated between battery cases 11, battery cells 1 are stacked while being thermally insulated by separator 2 to prevent induction of thermal runaway.

Separator 2 that is elastically deformed by being pressed against battery cell 1 is made of elastomer. The elastomer of separator 2 is a rubber-like elastic body having a hardness of, for example, A30 degrees to A90 degrees so as to be elastically deformed by being pressed against the battery cell 1. As the elastomer of separator 2, a synthetic rubber is suitable. As the synthetic rubber, any of a fluororubber, an isoprene rubber, a styrene butadiene rubber, a butadiene rubber, a chloropron rubber, a nitrile rubber, a hydrogenated nitrile rubber, a folylisobutylene rubber, an ethylene propylene rubber, an ethylene vinyl acetate copolymer rubber, a chlorosulfonated polyethylene rubber, an acrylic rubber, an epichlorohydrin rubber, a urethane rubber, a silicone rubber, a thermoplastic olefin rubber, an ethylene propylene diene rubber, a butyl rubber, and a polyether rubber can be used singly or in which a plurality of synthetic rubber sheets are stacked. In particular, the ethylene propylene rubber, the ethylene vinyl acetate copolymer rubber, the chlorosulfonated polyethylene rubber, the acrylic rubber, the fluororubber, and the silicone rubber have excellent heat insulating properties, and thus can realize high safety until a temperature of battery cell 1 rises to a high temperature. Further, it is preferable to use thermoplastic polyurethane rubber or foamed polyurethane rubber for separator 2 in which the elastomer is urethane rubber.

Separator 2 can absorb expansion of battery cell 1 without difficulty, and relax the maximum stress of end plates 3 and binding bar 4. Ideal separator 2 that absorbs expansion of battery cell 1 effectively absorbs small expansion of battery cell 1, and also absorbs large expansion to suppress maximum stress of end plates 3 and binding bar 4. Separator 2 that achieves this characteristic is required to have a characteristic that, in a process in which the internal pressure of battery cell 1 increases and the pressing force gradually increases, in a region where expansion of battery cell 1 is relatively small, separator 2 can quickly elastically deform and absorb expansion without difficulty, and a characteristic that separator 2 can deform and absorb expansion without exceeding the elastic limit even in a state where expansion of battery cell 1 becomes a maximum region.

Since the elastomer is elastically deformed, expansion of battery cell 1 can be absorbed as one plate-shaped separator 2. Separator 2 is made of an elastomer having a small Young's modulus, and can naturally absorb small expansion of battery cell 1. However, when the expansion of battery cell 1 becomes the maximum region and the pressing force becomes strong, separator 2 exceeds the elastic limit and cannot absorb the expansion without difficulty. When separator 2 is made of an elastomer having a large Young's modulus in order to increase a pressure of the elastic limit of separator 2, small expansion of battery cell 1 cannot be absorbed smoothly without difficulty. The expansion of battery cell 1 is specified under an external condition such as a charge and discharge current, but small expansion and large expansion are randomly repeated, but the frequency of occurrence of small expansion is higher than that of large expansion, and the characteristic that small expansion can be smoothly absorbed without difficulty is extremely important. Since the elastic limit of separator 2 made of an elastomer having a small Young's modulus capable of naturally absorbing small expansion having a high occurrence frequency is limited to a low value, separator 2 cannot stably absorb expansion having a large maximum region. When separator 2 cannot absorb the large expansion of the maximum region of battery cell 1, the pressure at which battery cell 1 pressurizes separator 2 increases, and the internal stress of end plates 3 and binding bar 4 significantly increases.

Figure 5:
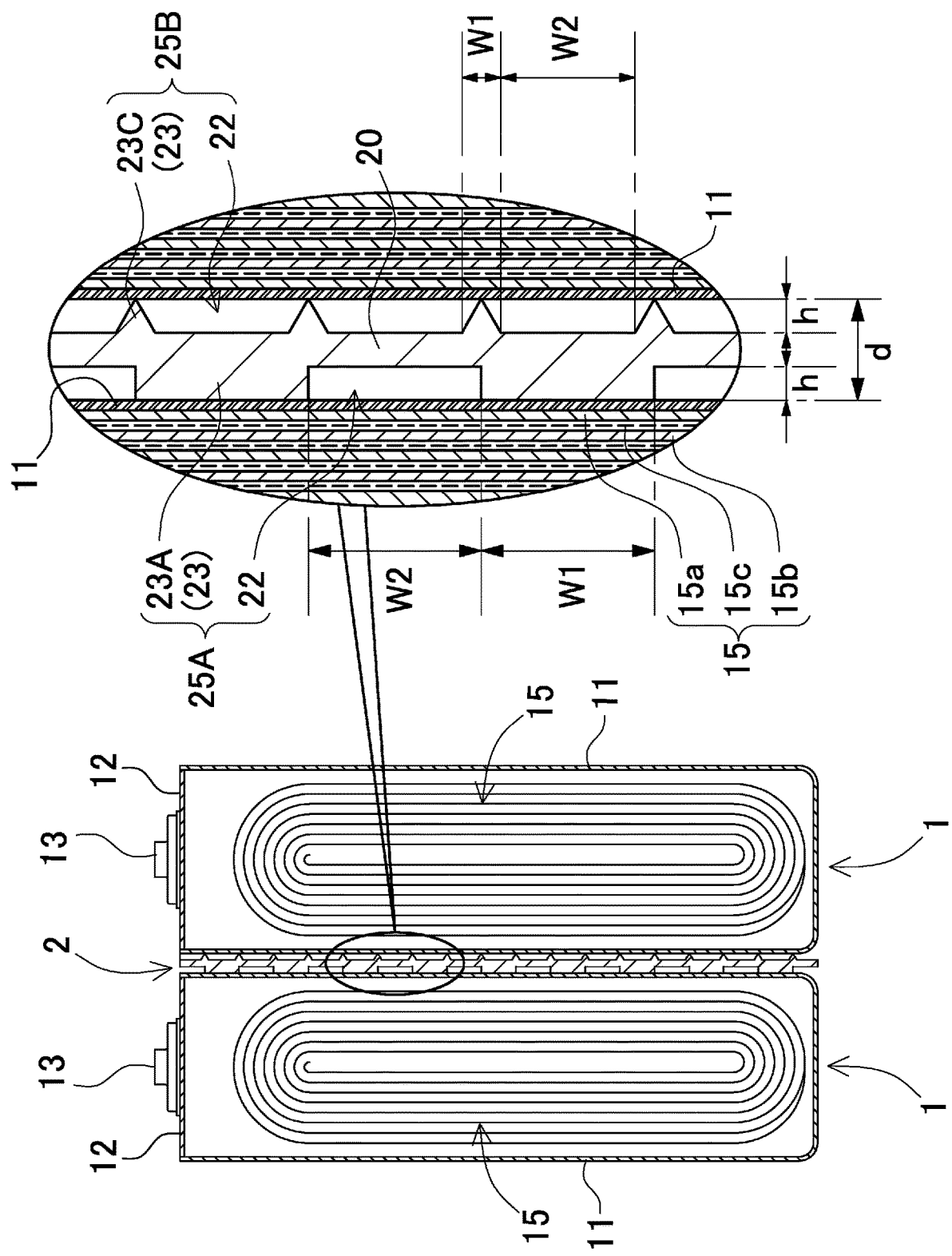
FIG. 5 is a partially enlarged cross-sectional view illustrating another example of the separator.
Figure 6:
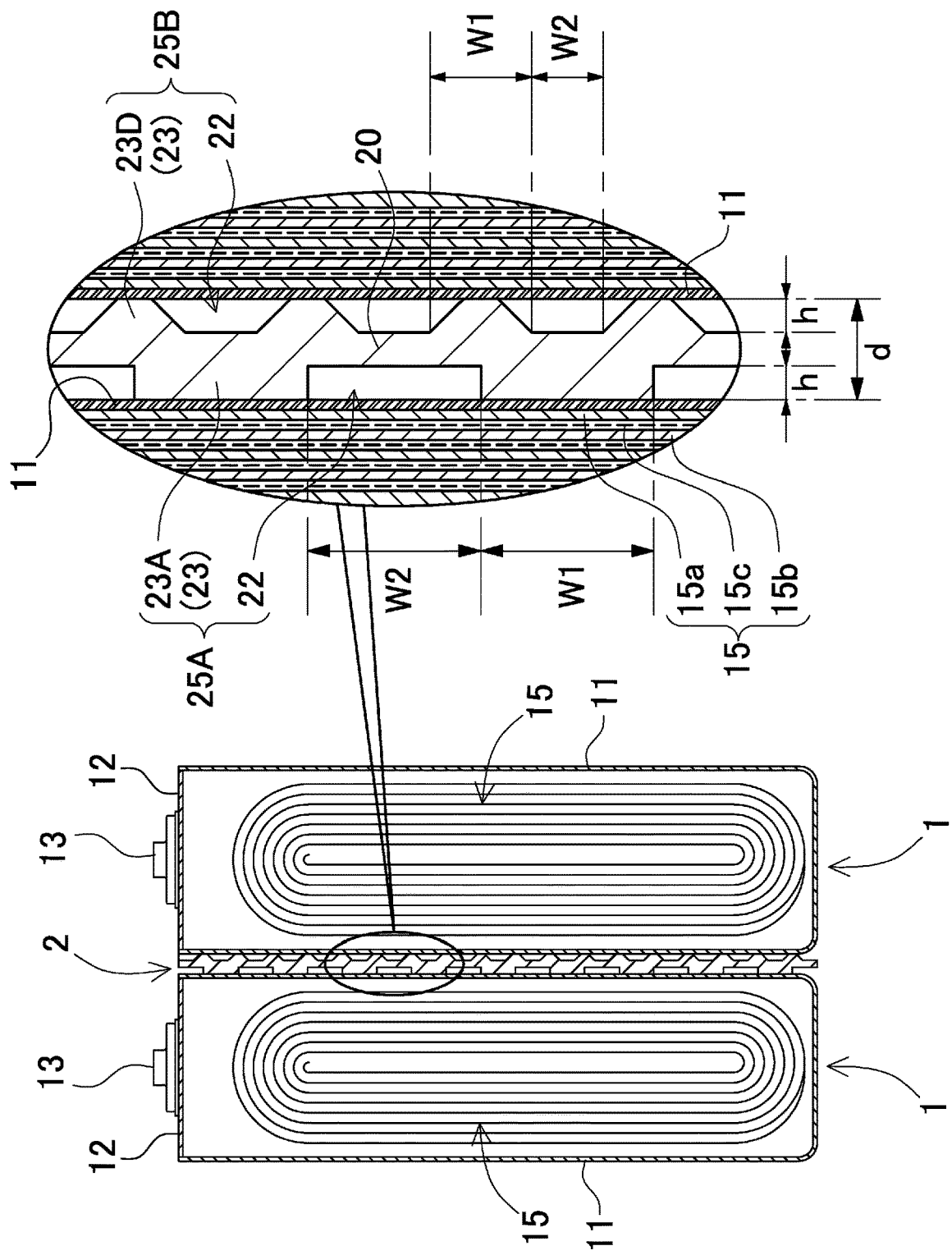
FIG. 6 is a partially enlarged cross-sectional view illustrating another example of the separator.

Separator 2 illustrated in FIGS. 4 to 6 has a plurality of protrusions 23 provided on surfaces of plate-shaped part 20 to form uneven layers 25 in order to smoothly absorb small expansion of battery cell 1 and to absorb large expansion of battery cell 1 by increasing an elastic limit. Separator 2 illustrated in these drawings includes uneven layers 25 in which protrusions 23 having different shapes are provided on both the surfaces, and amounts of change in thickness with respect to a pressing force of battery cell 1 are different. As illustrated in the drawing, uneven layers 25 provided on both the surfaces of plate-shaped part 20 are uneven layers 25 in which protrusions 23 having different contact areas with battery cells 1 are provided in an uncompressed state, and the amounts of change in thicknesses with respect to the pressing force are different.

In these drawings, separator 2 has a structure in which one surface (left side surface in the drawing) of plate-shaped part 20 is first uneven layer 25A, the other surface (right side surface in the drawing) is second uneven layer 25B, and second uneven layer 25B has a larger displacement amount with respect to the pressing force than first uneven layer 25A, that is, small expansion of battery cell 1 is absorbed without difficulty. In separator 2 illustrated in these drawings, a cross-sectional shape of protrusion 23A provided on first uneven layer 25A is a rectangular shape, and protrusions 23B, 23C, 23D provided on second uneven layer 25B are shaped such that a cross-sectional area in a plane parallel to a surface of the plate-shaped part increases from a contact part with battery cell 1 toward plate-shaped part 20. In separator 2 of FIG. 4, the cross-sectional shape of protrusion 23B of second uneven layer 25B is a semicircular shape or an arch shape, in separator 2 of FIG. 5, the cross-sectional shape of protrusion 23C of second uneven layer 25B is a triangular shape, and in separator 2 of FIG. 6, the cross-sectional shape of protrusion 23D of second uneven layer 25B is a trapezoidal shape, and the shape is more easily deformed than quadrangular protrusion 23A of first uneven layer 25A having a rectangular shape.

Figure 7:
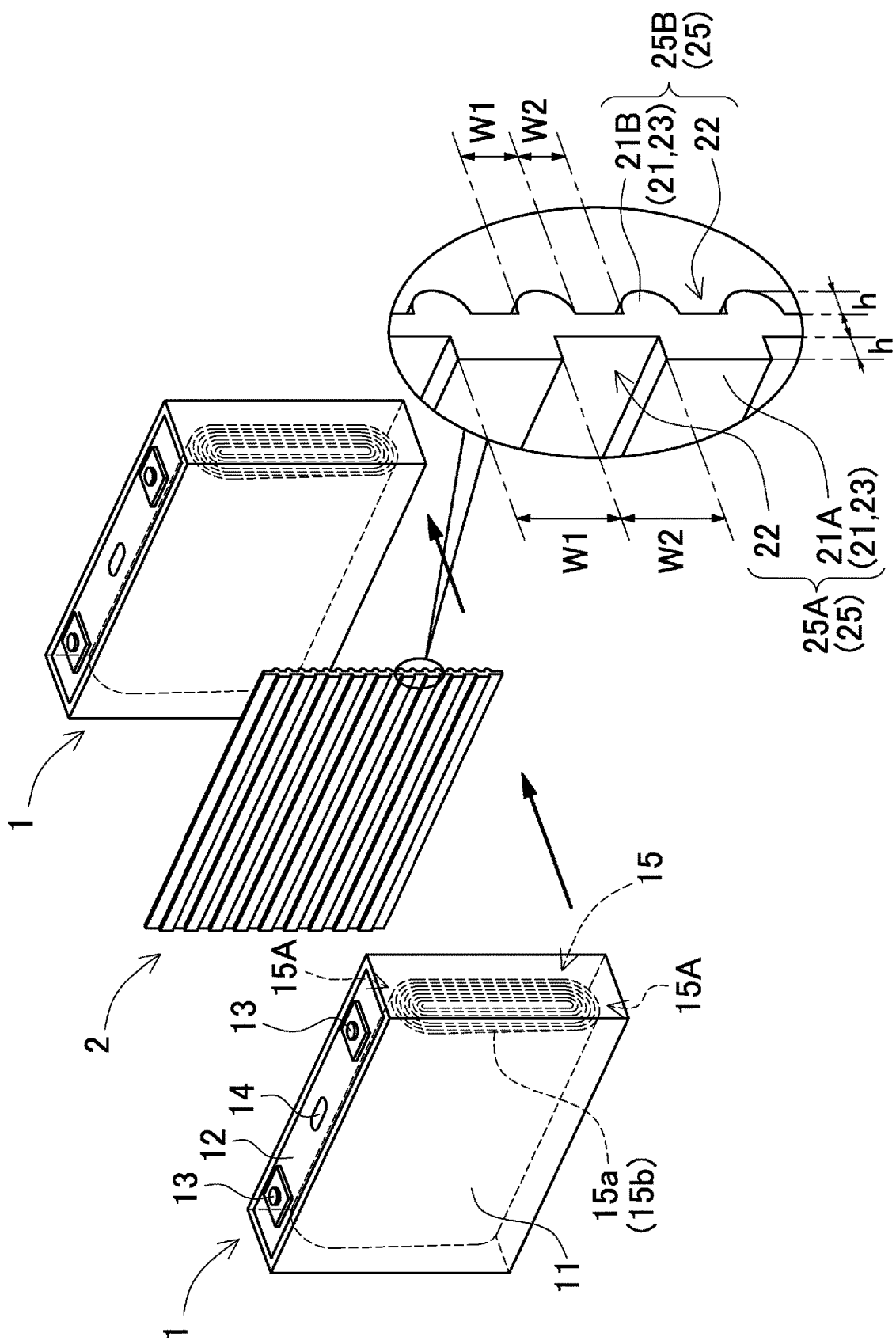
FIG. 7 is an exploded perspective view illustrating a stacked structure of battery cells and a separator.
Figure 8:
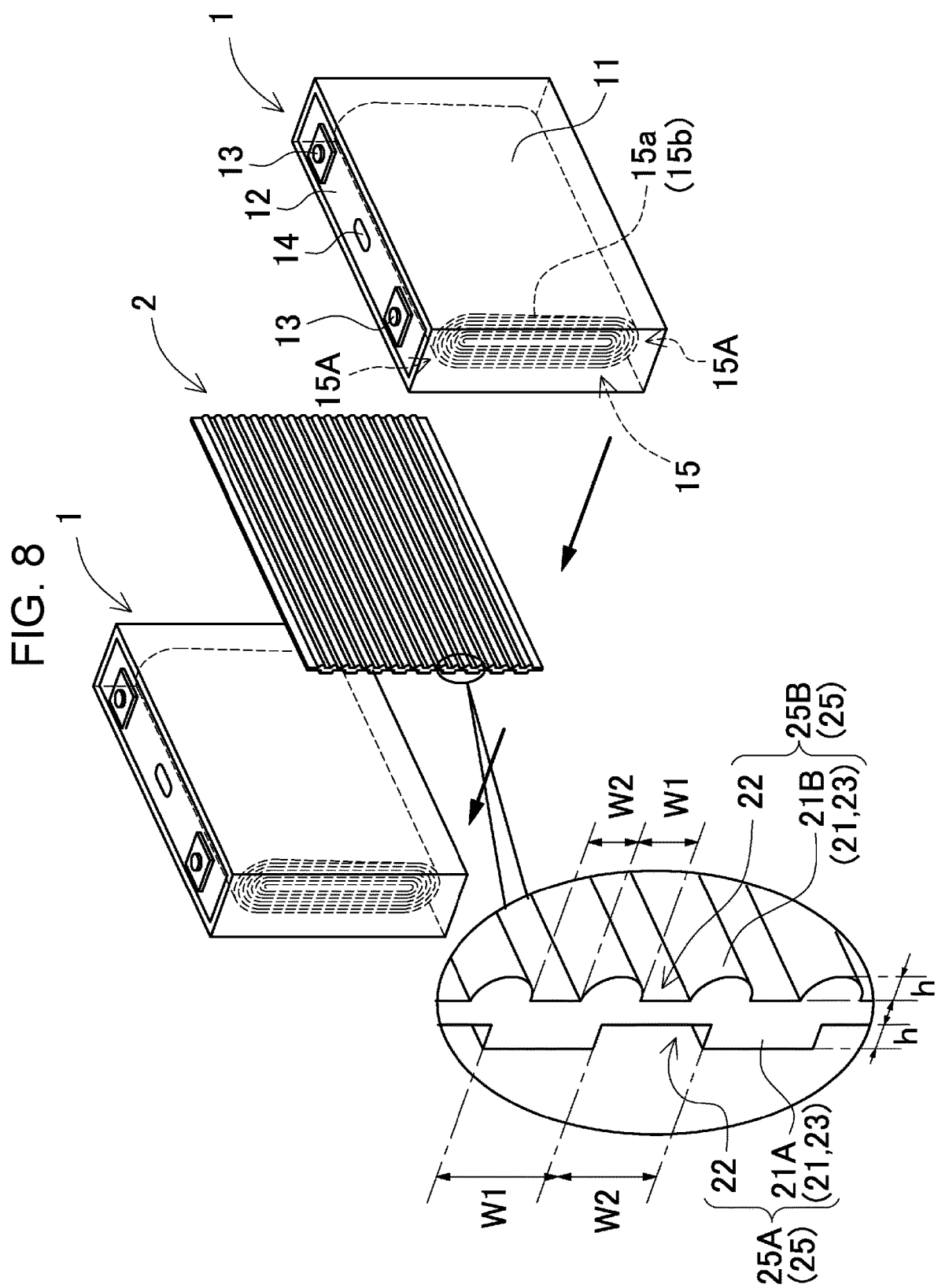
FIG. 8 is a back perspective view of the battery cells and the separator illustrated in FIG. 7.

In separator 2 illustrated in a perspective views of FIGS. 7 and 8, protrusions 23 of uneven layer 25 are formed as elongated ridges, and a plurality of rows of the ridges are provided on the surface of plate-shaped part 20. Further, in separator 2 in the drawing, a plurality of rows of ridges provided on uneven layer 25 are formed as parallel ridges 21 arranged parallel to each other, parallel grooves 22 are provided between the plurality of rows of parallel ridges 21, and parallel ridges 21 and parallel grooves 22 are alternately arranged. In separator 2, the plurality of rows of parallel ridges 21 locally press the surface of the expanding battery cell, and parallel ridges 21 are elastically deformed to absorb the expansion of battery cell 1. In separator 2, parallel ridges 21 provided on first uneven layer 25A and second uneven layer 25B have the cross-sectional shapes illustrated in FIGS. 4 to 6, and the deformation amount with respect to the pressing force of battery cell 1 is optimized between first uneven layer 25A and second uneven layer 25B.

In separator 2, in the region where the expansion of battery cell 1 is small, parallel ridges 21A of first uneven layer 25A are hardly deformed, parallel ridges 21B of second uneven layer 25B are elastically deformed to absorb the expansion of battery cell 1, and when the expansion of battery cell 1 becomes large and parallel ridges 21B of second uneven layer 25B are almost crushed, parallel ridges 21A of first uneven layer 25A are elastically deformed to absorb the expansion of battery cell 1. When the expansion of battery cell 1 further increases and parallel ridges 21A of first uneven layer 25A are almost crushed, plate-shaped part 20 is elastically deformed to absorb the expansion of battery cell 1.

Figure 9:
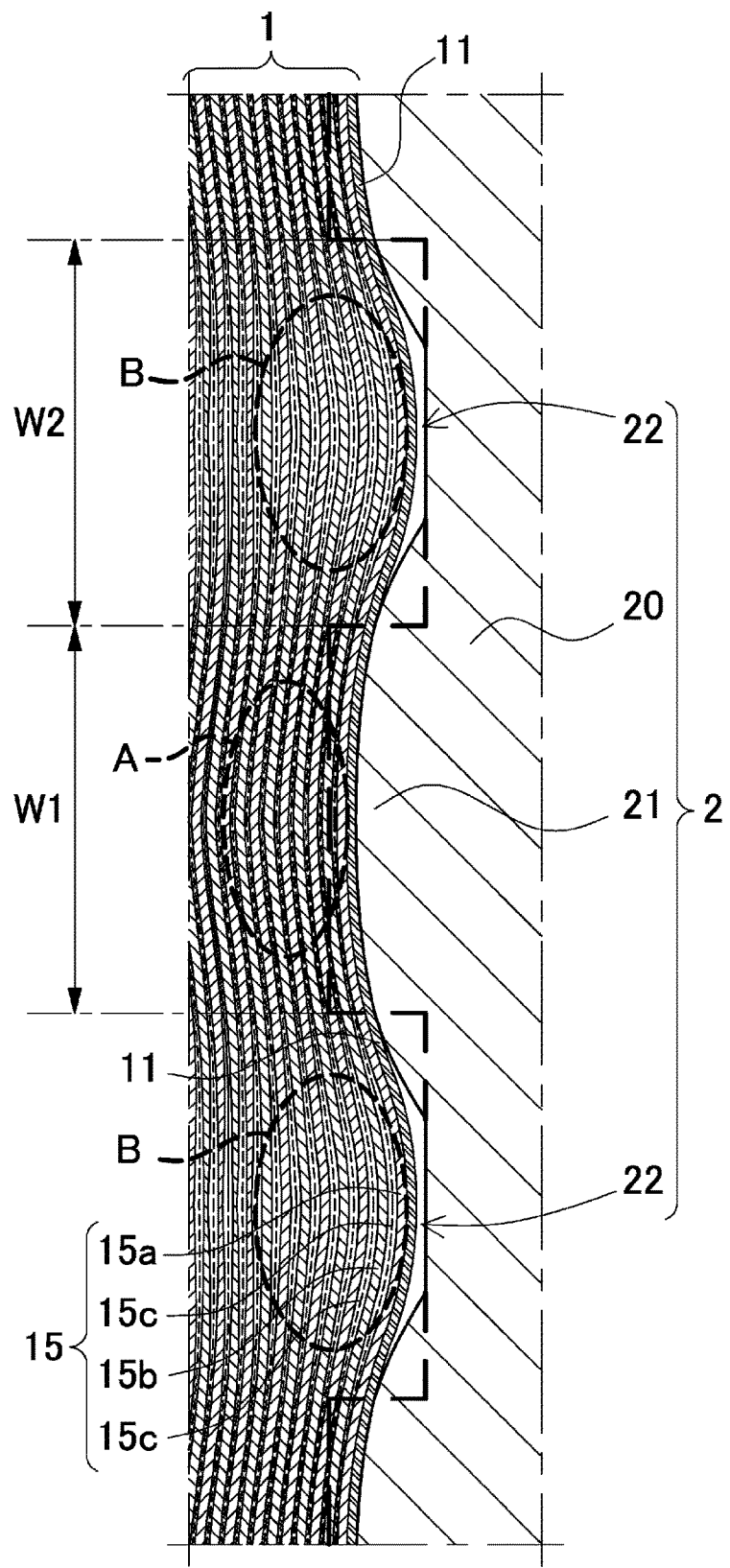
FIG. 9 is an enlarged cross-sectional view of a main part illustrating a state in which a surface of an expanding battery cell is pushed by parallel ridges and deformed into a wave shape.

In battery cells 1 pressed by parallel ridges 21, a region pressed by parallel ridges 21 becomes a recess, and a region opposed to parallel grooves 22 protrudes and is deformed into a wave shape. An enlarged cross-sectional view of a main part of FIG. 9 exaggeratedly illustrates a state in which the surface of battery cell 1 is pushed by parallel ridges 21 and deformed into a wave shape. Battery cell 1 whose surface is deformed into a wave shape deforms a surface of electrode 15 having a stacked structure housed in battery case 11 into a wave shape. In electrode 15 having the stacked structure, region A which is pressed by the plurality of rows of parallel ridges 21 to become the recess has a high density, and protruding region B which is a region facing parallel grooves 22 has a low density. Therefore, low density region B is generated in a stripe manner, and low density region B improves the fluidity of the electrolyte solution. Further, separator 2 described above is characterized in that, since low-density region B is generated in a stripe manner in electrode 15 while the expansion of battery cell 1 is absorbed by the elastic deformation of the elastomer, low-density region B can be generated in a stripe manner in electrode 15 to improve the fluidity of the electrolyte solution even at the time of expansion of battery cell 1 in which the fluidity of the electrolyte solution decreases.

Battery cell 1 illustrated in FIGS. 7 and 8 is a prismatic battery in which a stacked surface of battery case 11 on which separator 2 is stacked is a quadrangular shape, positive and negative electrode layers 15a, 15b having an elongated band-shape are wound to form spiral electrode 15, and spiral electrode 15 is housed in battery case 11 as a plate shape pressed in a planar shape. In electrode 15, elongated band-shaped positive and negative electrode layers 15a, 15b are stacked with insulating sheet 15c interposed therebetween, and wound to form spiral electrode 15, and spiral electrode 15 is pressed into a planar shape and housed in rectangular battery case 11. In elastomer separator 2, as illustrated in the drawing, parallel ridges 21 and parallel grooves 22 are arranged in a state extending in a width direction of band-shaped positive and negative electrode layers 15a, 15b. In separator 2, parallel ridges 21 are arranged in parallel with an extending direction of U-shaped curved part 15A of spiral electrode 15, and high density region A and low density region B extending in the width direction of electrode layers 15a, 15b are formed in a stripe shape on the surface of electrode 15, so that high density region A and low density region B can be naturally provided in a stripe shape on spiral electrode 15 to improve the fluidity of the electrolyte solution.

Lateral width (W1) and height (h) of each of parallel ridges 21 and opening width (W2) of each of parallel grooves 22 are set to a dimension that allows parallel ridges 21 to press a surface of battery case 11 to deform the surface into a wave shape in consideration of hardness of the elastomer. For example, separator 2 having an elastomer hardness of A30 degrees to A90 degrees has lateral width (W1), for example, in a range from 1 mm to 20 mm inclusive, preferably in a range from 2 mm to 10 mm inclusive at a boundary region with a bottom of parallel ridges 21, that is, plate-shaped part 20 so that separator 2 can be deformed into a wave shape by pressing metal battery case 11 of expanding battery cells 1. In separator 2 of FIGS. 7 and 8, lateral width (W1) of parallel ridge 21B of second uneven layer 25B which is easily deformed is made narrower than lateral width (W1) of parallel ridge 21A of first uneven layer 25A which is hardly deformed. Height (h) of parallel ridge 21 is, for example, in a range from 0.1 mm to 2 mm inclusive, preferably in a range from 0.2 mm to 1.5 mm inclusive, opening width (W2) of parallel groove 22 is in a range from 1 mm to 20 mm inclusive, preferably in a range from 2 mm to 10 mm inclusive, and ratio (W1/W2) of lateral width (W1) of parallel ridge 21 to opening width (W2) of parallel groove 22 is in a range from 0.1 to 10 inclusive, preferably in a range from 0.5 to 2 inclusive.

Elastomer separator 2 can absorb the expansion of the battery case 11 more largely by increasing height (h) of the parallel ridges 21 and widening opening width (W2) of parallel groove 22. However, when parallel ridges 21 are too high, the separator becomes thick and buckles easily. Therefore, height (h) of parallel ridges 21 is set within the above range in consideration of the thickness allowed for separator 2 and the fact that battery case 11 can be deformed into a wave shape by being locally pressed. Further, opening width (W2) of parallel grooves 22, and ratio (W1/W2) of lateral width (W1) of parallel ridges 21 to opening width (W2) of parallel grooves 22 specify a pitch at which the surface of battery case 11 is deformed into a wave shape, and thus are set within the above ranges in consideration of setting the fluidity of the electrolyte solution to a preferable state while the expansion of battery cell 1 is supported by the plurality of rows of parallel ridges 21. For example, in power supply device 100 in which battery cell 1 is a prismatic lithium ion battery, battery case 11 is an aluminum plate having a thickness of 0.3 mm, an area of the separator stacked surface is 100 cm$^2$, lateral width (W1) of parallel ridges 21 and opening width (W2) of parallel grooves 22 are 5 mm, height (h) of parallel ridges 21 is 0.5 mm, a hardness of the elastomer is A60 degrees, and the number of battery cells 1 to be stacked is 12, the surface facing separator 2 is deformed into a wave shape in a state where battery cell 1 expands, and the fluidity of the electrolyte solution can be improved.

In power supply device 100, in order to miniaturize battery block 10 and increase the charging capacity, it is important to thin separator 2 to absorb the expansion of battery cell 1. Thus, elastomer separator 2 has thickness (d), for example, in a range from 2 mm to 8 mm inclusive, more preferably in a range from 1.5 mm to 5 mm inclusive.

Figure 10:
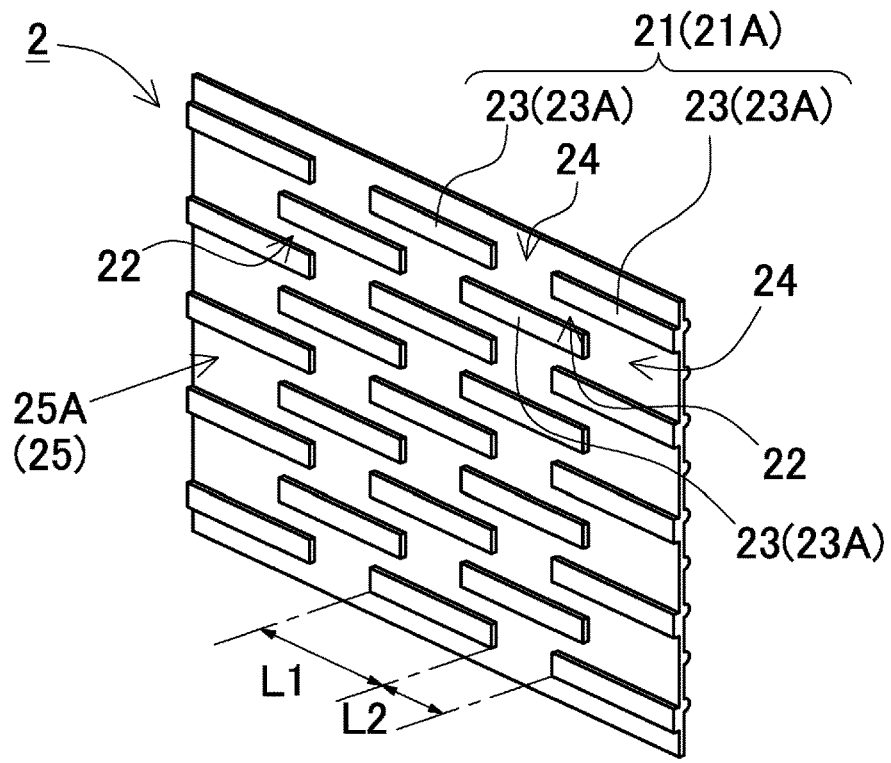
FIG. 10 is a perspective view illustrating another example of the separator.
Figure 11:
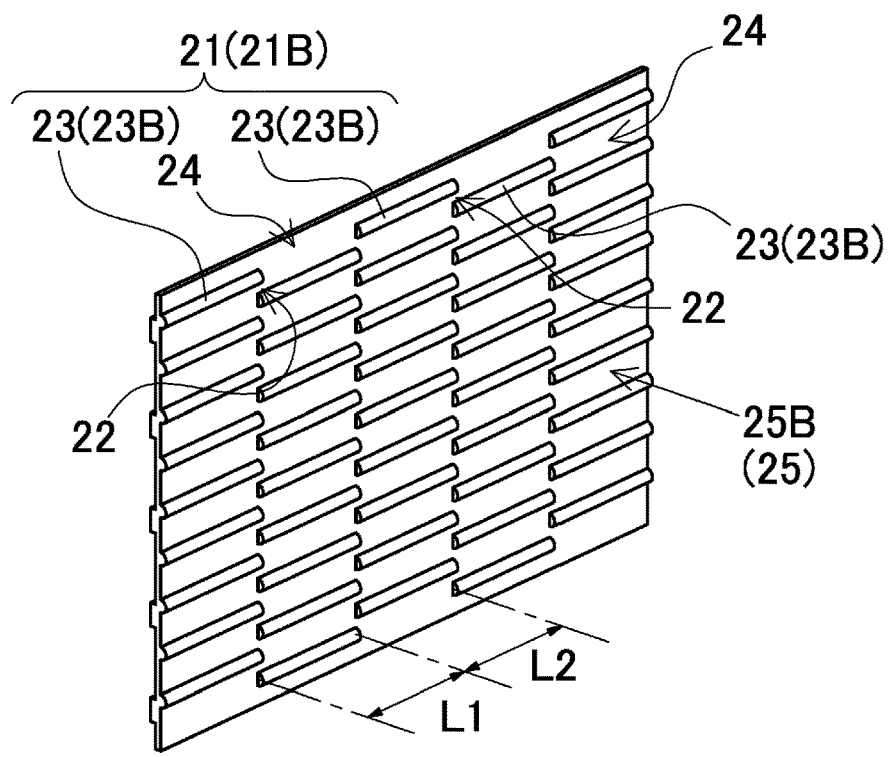
FIG. 11 is a back perspective view of the separator illustrated in FIG. 10.

Separator 2 illustrated in FIGS. 7 and 8 has a structure in which an entire length of the plurality of rows of parallel ridges 21 extending in a lateral width direction (horizontal direction in the drawing) of battery cell 1 is substantially equal to a lateral width of battery cell 1, and a facing surface of battery cell 1 is pressed by the plurality of rows of parallel ridges 21 extending in a streak parallel to each other. Furthermore, as illustrated in FIGS. 10 and 11, separator 2 can also be divided into a plurality of parallel ridges 21 extending in the longitudinal direction. In separator 2 illustrated in FIGS. 10 and 11, cut part 24 is provided at an intermediate part of parallel ridges 21 to divide one row of parallel ridges 21 into a plurality of protrusions 23. Further, in adjacent parallel ridges 21, protrusions 23 are arranged in a staggered manner when viewed from a front. That is, the positions of protrusions 23 are shifted in a left-right direction between adjacent parallel ridges 21 such that protrusion 23 of the other parallel ridge 21 is positioned at a position facing cut part 24 provided on one parallel ridge 21. In separator 2 illustrated in the drawing, in order to form protrusions 23 of parallel ridges 21 adjacent to each other into a staggered shape, cut parts 24 are also provided at both ends of parallel ridges 21 in every other row. As described above, the structure in which the plurality of divided protrusions 23 are arranged in a staggered shape has an advantage that the pressing force received from battery cell 1 can be uniformly dispersed. However, the plurality of divided protrusions can be arranged vertically and horizontally or randomly. Separator 2 including parallel ridges 21 having the shape described above is more easily elastically deformed than separator 2 having a structure in which parallel ridges 21 are not divided, and has an advantage that expansion of battery cell 1 can be effectively absorbed.

Furthermore, in separator 2 having the shape illustrated in FIGS. 10 and 11, the ease of elastic deformation of parallel ridges 21 can be adjusted by adjusting length (L1) of protrusion 23 and length (L2) of cut part 24. For example, separator 2 can be easily elastically deformed by increasing ratio (L2/L1) of length (L2) of cut part 24 to length (L1) of protrusion 23, and on the contrary, separator 2 can be hardly elastically deformed by decreasing ratio (L2/L1). That is, separators 2 can be deformed more easily by dividing parallel ridges 21 into a plurality of parts than a structure in which parallel ridges 21 are not divided, and can be deformed more easily by adjusting ratio (L2/L1). For example, as illustrated in FIG. 10 and FIG. 11, by making ratio (L2/L1) of second uneven layer 25B smaller than ratio (L2/L1) of first uneven layer 25A, separator 2 can more easily deform second uneven layer 25B, suppress deformation in first uneven layer 25A while reliably deforming battery cell 1 with small expansion, and reliably deform battery cell 1 with intermediate expansion. Furthermore, ratio (L2/L1) of length (L2) of cut part 24 to length (L1) of protrusion 23 can be changed depending on the region even in one surface, that is, also in one uneven layer 25. For example, ratio (L2/L1) can be increased to easily absorb the deformation in a region facing a central part where the deformation amount increases when battery cell 1 expands, and ratio (L2/L1) can be decreased to suppress the deformation in a region facing an outer peripheral part where the deformation amount during expansion is small.

In battery cell 1 described above, as illustrated in FIGS. 7 and 8, plate-shaped spiral electrode 15 is housed in battery case 11 such that the axis directs in the width direction of battery cell 1. Therefore, separator 2 is stacked on the facing surface of battery cell 1 such that the extending direction of parallel ridges 21 and parallel grooves 22 is the width direction of battery cell 1. As described above, parallel ridges 21 and parallel grooves 22 of separator 2 are stacked so as to extend in the horizontal direction in the drawing, whereby parallel ridges 21 and parallel grooves 22 can be arranged on the surface of battery cell 1 so as to be parallel to the axis of spiral electrode 15. As a result, when battery cell 1 expands, the high density region and the low density region extending in the width direction of electrode layers 15a, 15b are formed in a stripe shape on the surface of spiral electrode 15, and the fluidity of the electrolyte solution can be improved.

Figure 12:
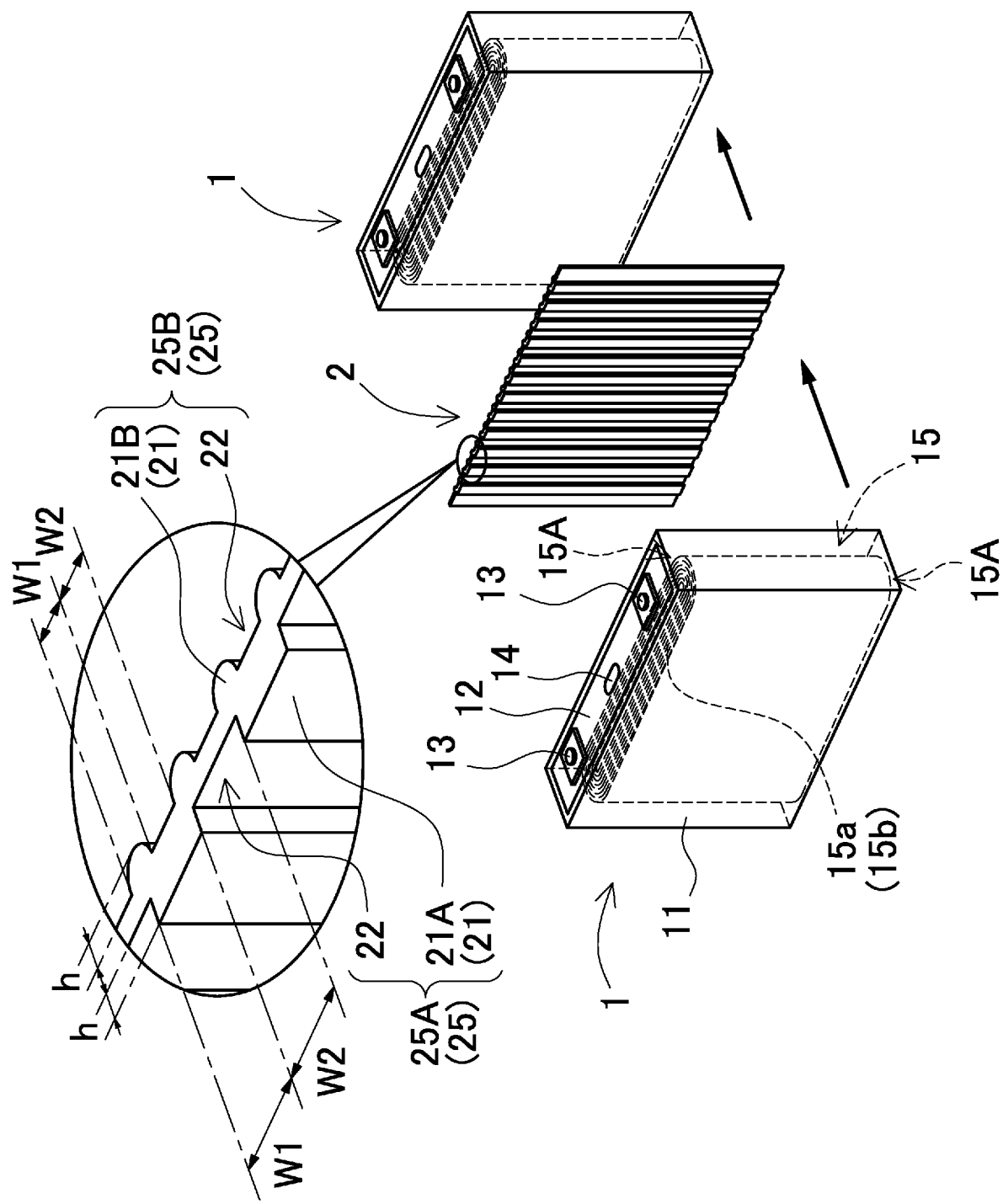
FIG. 12 is an exploded perspective view illustrating a stacked structure of battery cells and a separator of another example.

However, as illustrated in FIG. 12, in battery cell 1, plate-shaped spiral electrode 15 can also be housed in battery case 1 such that the axis directs in the height direction of battery cell 1 and the depth direction of battery case 11. Separator 2 stacked on battery cell 1 having this structure is stacked on the facing surface of battery cell 1 such that the extending direction of parallel ridges 21 and parallel grooves 22 is the height direction of battery cell 1. According to this structure, parallel ridges 21 and parallel grooves 22 of separator 2 are stacked on battery cells 1 so as to extend in the up-down direction in the drawing, whereby parallel ridges 21 and parallel grooves 2 can be arranged on the surface of battery cells 1 so as to be parallel to the axis of spiral electrode 15. As a result, when battery cell 1 expands, the high density region and the low density region extending in the width direction of electrode layers 15a, 15b are formed in a stripe shape on the surface of spiral electrode 15, and the fluidity of the electrolyte solution can be improved.

The power supply device described above can be used as a power source for a vehicle where electric power is supplied to a motor used for causing an electric vehicle to travel. As the electric vehicle on which the power supply device is mounted, an electric vehicle such as a hybrid automobile or a plug-in hybrid automobile that travels by both an engine and a motor, or an electric automobile that travels only by a motor can be used, and the power supply device is used as a power source for the vehicle. Note that, in order to obtain electric power for driving a vehicle, an example of constructing large-capacity and high-output power supply device 100 will be described below in which a large number of the above-described power supply devices are connected in series or in parallel, and a necessary controlling circuit is further added.

Power Supply Device for Hybrid Automobile

Figure 13:
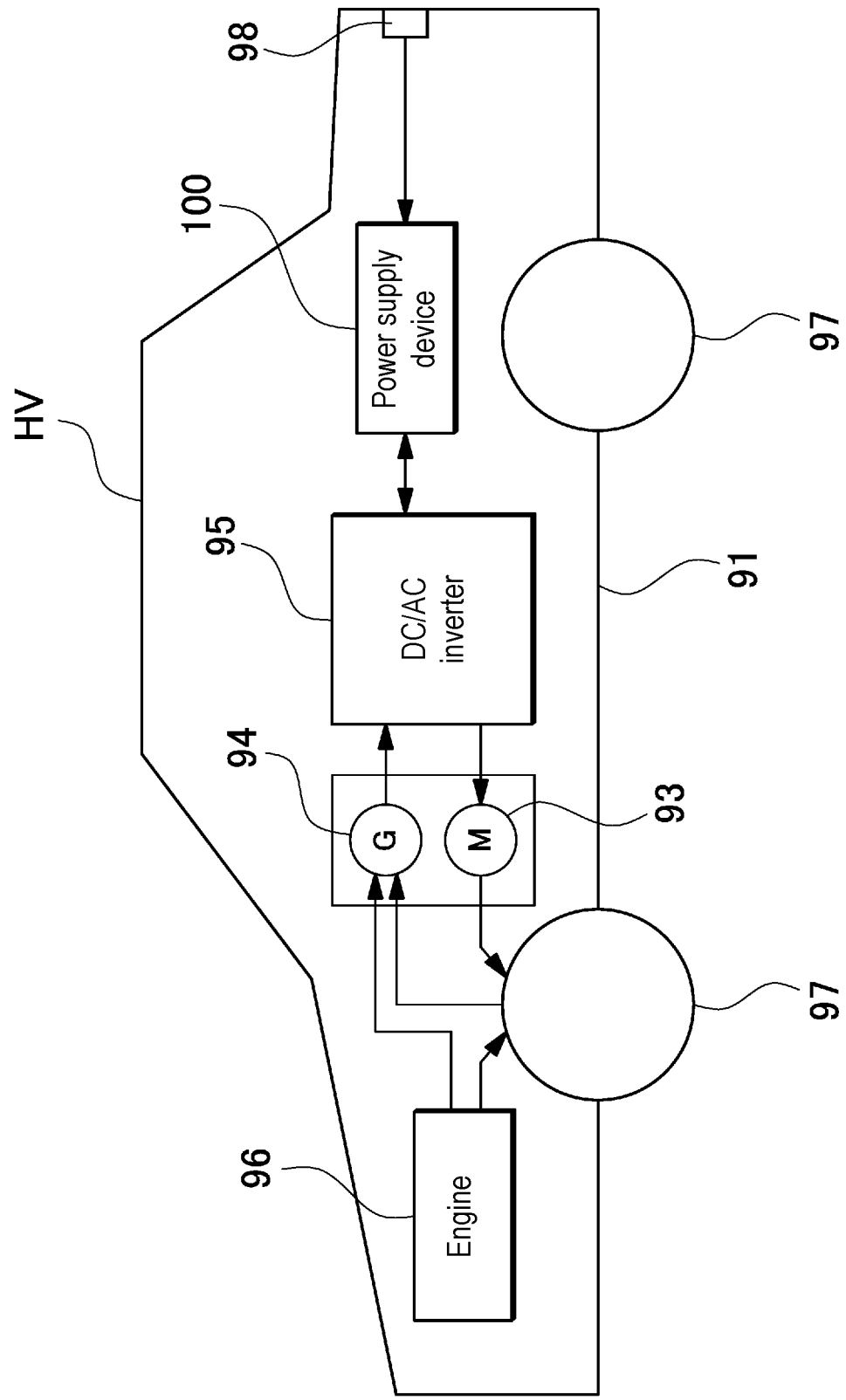
FIG. 13 is a block diagram illustrating an example in which a power supply device is mounted on a hybrid automobile that travels with an engine and a motor.

FIG. 13 illustrates an example of a power supply device incorporated in a hybrid automobile that is driven by both an engine and a motor. Vehicle HV incorporating the power supply device illustrated in this figure includes vehicle body 91, engine 96 and motor 93 for traveling to cause vehicle body 91 to travel, wheels 97 that are driven by engine 96 and motor 93 for traveling, power supply device 100 to supply motor 93 with electric power, and power generator 94 to charge a battery included in power supply device 100. Power supply device 100 is connected to motor 93 and power generator 94 via DC/AC inverter 95. Vehicle HV travels by both motor 93 and engine 96 while charging and discharging the battery of power supply device 100. Motor 93 is driven in a region where engine efficiency is low, for example, during acceleration or low-speed traveling, and causes the vehicle to travel. Motor 93 is driven by electric power supplied from power supply device 100. Power generator 94 is driven by engine 96 or by regenerative braking generated at the time of applying braking to the vehicle, and charges the battery of power supply device 100. Note that as illustrated in FIG. 13, vehicle HV may be provided with charging plug 98 for charging power supply device 100. By connecting charging plug 98 to an external power source, power supply device 100 can be charged.

Power Supply Device for Electric Automobile

Figure 14:
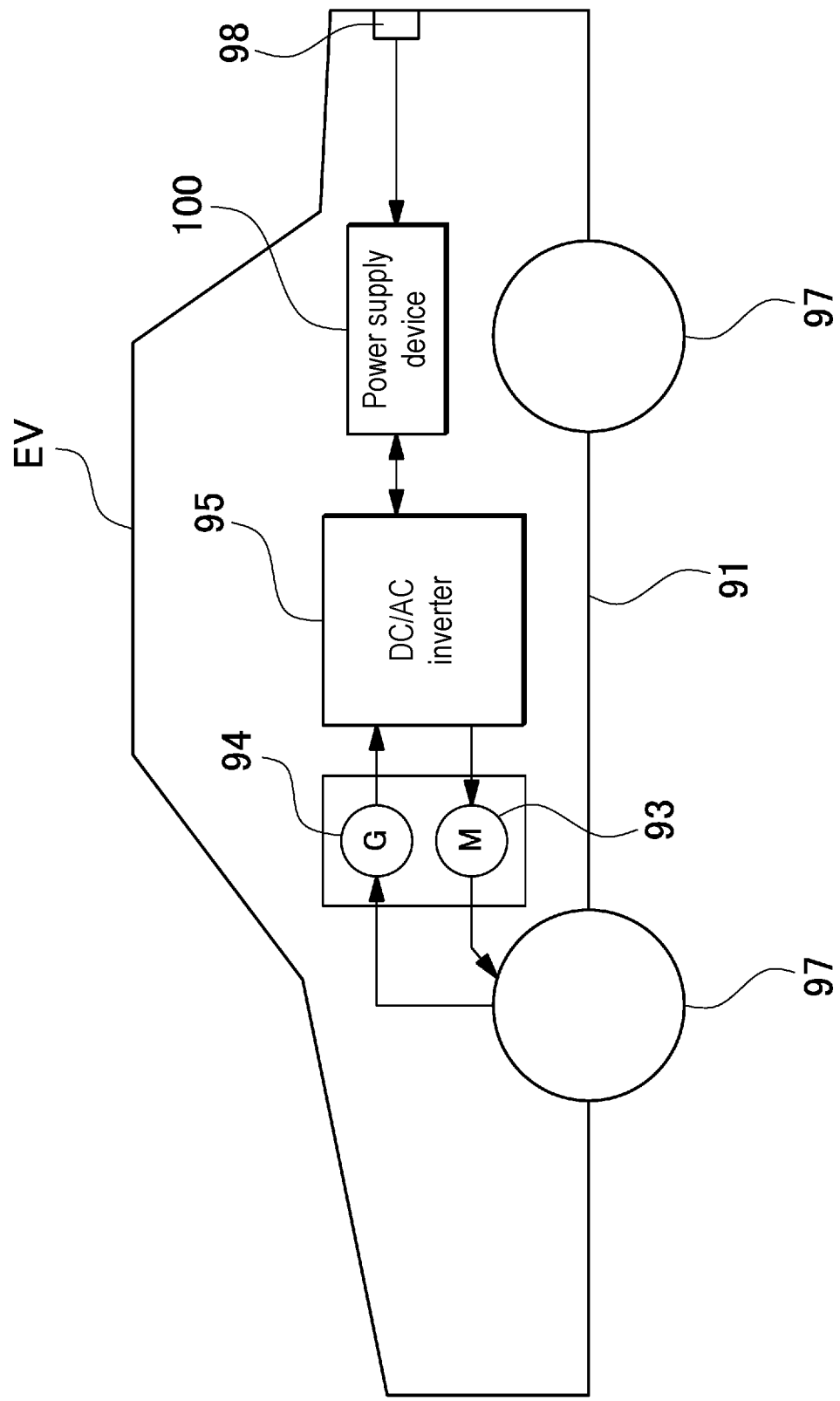
FIG. 14 is a block diagram illustrating an example in which a power supply device is mounted on an electric automobile that travels only with a motor.

Further, FIG. 14 illustrates an example in which a power supply device is mounted on an electric automobile that runs only on a motor. Vehicle EV illustrated in this figure on which the power supply device is mounted includes vehicle body 91, motor 93 for travelling that causes vehicle body 91 to travel, wheels 97 driven by motor 93, power supply device 100 that supplies electric power to motor 93, and power generator 94 that charges a battery of power supply device 100. Power supply device 100 is connected to motor 93 and power generator 94 via DC/AC inverter 95. Motor 93 is driven by electric power supplied from power supply device 100. Power generator 94 is driven by an energy at the time of applying regenerative braking to vehicle EV and charges the battery of power supply device 100. Further, vehicle EV includes charging plug 98, and power supply device 100 can be charged by connecting charging plug 98 to an external power source.

Power Supply Device for Power Storage Device

Figure 15:
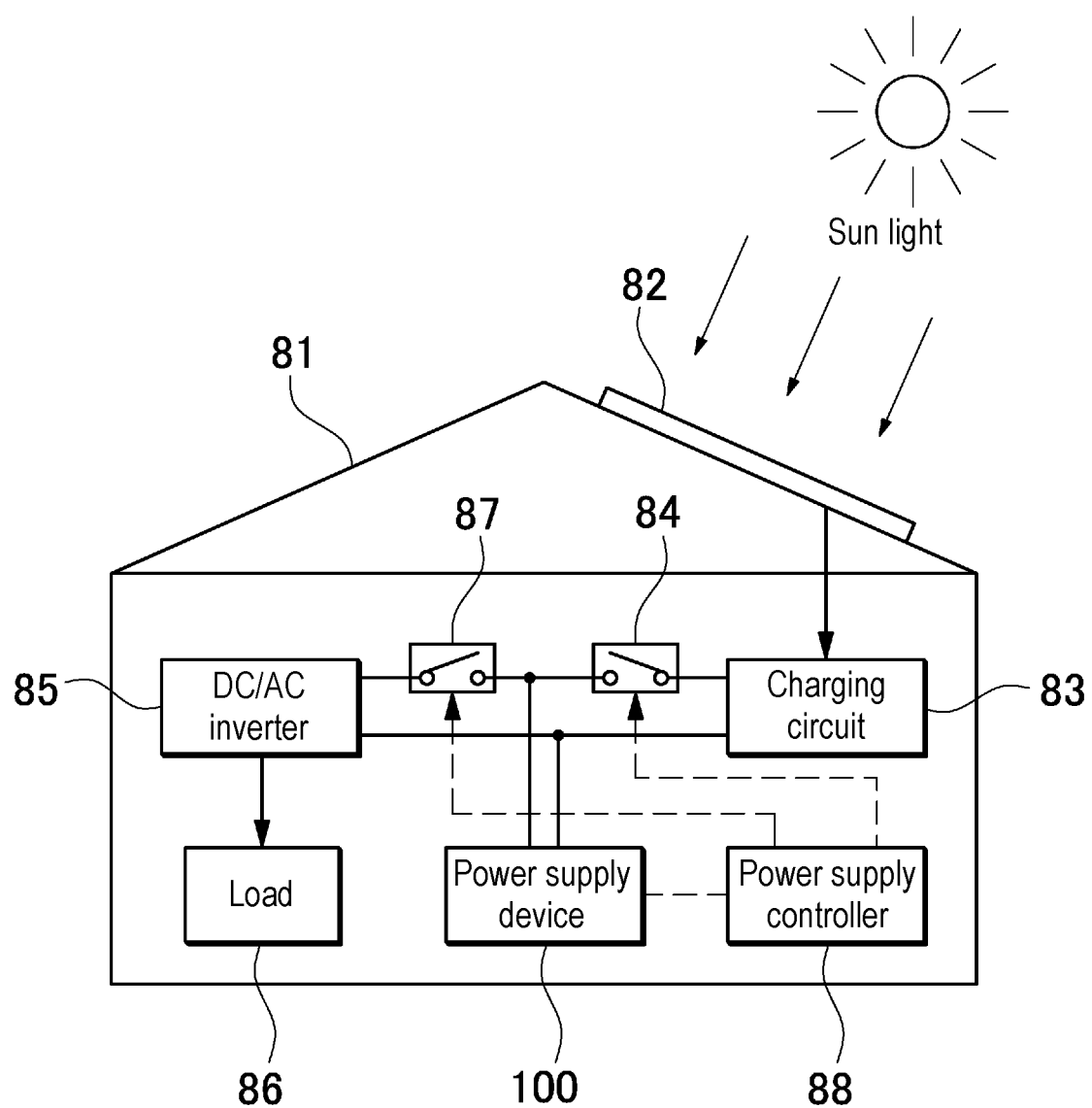
FIG. 15 is a block diagram illustrating an example of application to a power supply device for power storage.

Further, the present invention does not limit the application of the power supply device to a power source for a motor that causes a vehicle to travel. The power supply device according to the exemplary embodiment can be used also as a power source for a power storage device that charges a battery with electric power generated by solar power generation, wind power generation, or the like, and stores electricity. FIG. 15 illustrates a power storage device that charges and stores batteries of power supply device 100 with solar battery 82.

The power storage device illustrated in FIG. 15 charges the batteries of power supply device 100 with electric power generated by solar battery 82 arranged on a roof, a rooftop, or the like of building 81 such as a house or a factory. In this power storage device, the battery of power supply device 100 is charged by charging circuit 83 using solar battery 82 as a charging power source, and thereafter, electric power is supplied to load 86 via DC/AC inverter 85. Therefore, the power storage device includes a charge mode and a discharge mode. In the power storage device illustrated in the figure, DC/AC inverter 85 is connected to power supply device 100 via discharging switch 87, and charging circuit 83 is connected to power supply device 100 via charging switch 84. Discharging switch 87 and charging switch 84 are turned on and off by power supply controller 88 of the power storage device. In the charge mode, power supply controller 88 turns on charging switch 84 and turns off discharging switch 87 to allow charging from charging circuit 83 to power supply device 100. Further, when charging is completed and the battery is fully charged or when the battery is in a state where a capacity of a predetermined value or more is charged, power supply controller 88 turns off charging switch 84 and turns on discharging switch 87 to switch the mode to the discharge mode and allows discharging from power supply device 100 to load 86. Furthermore, when necessary, the power supply controller can turn on charging switch 84 and turn on discharging switch 87 to supply electricity to load 86 and charge power supply device 100 simultaneously.

Further, although not illustrated, the power supply device can be used as a power source for a power storage device that stores electricity by charging a battery using midnight electric power at nighttime. The power supply device that is charged with midnight electric power is charged with the midnight electric power that is surplus electric power generated by a power station, and outputs the electric power during the daytime when an electric power load increases, which can limit peak electric power during the daytime to a small value. Furthermore, the power supply device can also be used as a power source charged with both an output of a solar battery and midnight electric power. This power supply device can effectively utilize both electric power generated by the solar battery and the midnight electric power, and can efficiently store power in consideration of weather and power consumption.

The power storage device as described above can be suitably used for applications such as a backup power supply device that can be mounted on a rack of a computer server, a backup power supply device for a radio base station such as a cellular phone, a power source for household or factory power storage, a power source for street lamps, and the like, a power storage device combined with a solar battery, and a backup power source for traffic lights or traffic displays for roads.

INDUSTRIAL APPLICABILITY

The power supply device according to the present invention is suitably used as a power source for a large current used for a power source of a motor for driving an electric vehicle such as a hybrid automobile, a fuel battery automobile, an electric automobile, or an electric motorcycle. Examples include a power supply device for a plug-in hybrid electric automobile and a hybrid electric automobile that can switch between an EV travelling mode and an HEV travelling mode, an electric automobile, and the like. Further, the present invention can be appropriately used for applications such as a backup power supply device that can be mounted on a rack of a computer server, a backup power supply device for a radio base station such as a cellular phone, a power source for power storage for home and factory use, a power source for street lamps, and the like, a power storage device combined with a solar battery, and a backup power source for traffic lights and the like.

REFERENCE MARKS IN THE DRAWINGS

100: power supply device
1: battery cell
2: separator
3: end plate
4: binding bar
10: battery block
11: battery case
12: sealing plate
13: electrode terminal
14: safety valve
15: electrode
15A: U-shaped curved part
15a: electrode layer
15b: electrode layer
15c: insulating sheet
20: plate-shaped part
21, 21A, 21B: parallel ridge
22: parallel groove
23, 23A, 23B, 23C, 23D: protrusion
24: cut part
25: uneven layer
25A: first uneven layer
25B: second uneven layer
81: building
82: solar battery
83: charging circuit
84: charging switch
85: DC/AC inverter
86: load
87: discharging switch
88: power supply controller
91: vehicle body
93: motor
94: power generator
95: DC/AC inverter
96: engine
97: wheel
98: charging plug
HV, EV: vehicle

The invention claimed is:
1. A power supply device comprising:
a battery block including a plurality of battery cells in a thickness with a separator interposed between the plurality of battery cells, the plurality of battery cells stacked;
a pair of end plates disposed on both end surfaces of the battery block; and
a binding bar that is coupled to the pair of end plates and fixes the battery block in a pressurized state via the end plates,
wherein
the separator is an elastomer, having a first uneven layer and a second uneven layer opposite to the first uneven layer, the first uneven layer and the second uneven layer including different amounts of change in thickness with respect to a pressing force of the plurality of battery cells, each of the first uneven layer and the second uneven layer includes a plurality of protrusions, the protrusions are ridges, ridges being elongated, a plurality of rows of the ridges are provided on the surfaces of the plate-shaped part, the plurality of rows of ridges include parallel ridges arranged in parallel with each other, and the first and second uneven layers alternately arranged a plurality of rows of the parallel ridges and a plurality of rows of parallel grooves, in the first uneven layer of the plate-shaped part, the parallel ridges each including a rectangular cross-sectional shape are provided, in the second uneven layer of the plate-shaped part, the parallel ridges each including a lateral width gradually narrowed toward a battery cell connection surface are provided, and on both the surfaces of the plate-shaped part, the first and second uneven layers including different amounts of change in thickness with respect to a pressing force are provided.

2. The power supply device according to claim 1, wherein the elastomer of the separator is synthetic rubber.

3. The power supply device according to claim 2, wherein the synthetic rubber of the elastomer is any of a fluororubber, an isoprene rubber, a styrene butadiene rubber, a butadiene rubber, a chloropron rubber, a nitrile rubber, a hydrogenated nitrile rubber, a folylisobutylene rubber, an ethylene propylene rubber, an ethylene vinyl acetate copolymer rubber, a chlorosulfonated polyethylene rubber, an acrylic rubber, an epichlorohydrin rubber, a urethane rubber, a silicone rubber, a thermoplastic olefin rubber, an ethylene propylene diene rubber, a butyl rubber, and a polyether rubber.

4. The power supply device according to claim 1, wherein the protrusions including different contact areas with the plurality of battery cells in an uncompressed state are provided on both surfaces of the plate-shaped part.

5. The power supply device according to claim 1, wherein the first and second uneven layers include, from a contact part with the plurality of battery cells toward the plate-shaped part, the protrusions including a larger cross-sectional area in a plane parallel to a surface of the plate-shaped part.

6. The power supply device according to claim 1, wherein in the second uneven layer of the plate-shaped part, the parallel ridges including a cross-sectional shape of any of an arch shape, a triangular shape, and a trapezoidal shape are provided.

7. An electric vehicle including the power supply device according to claim 1, the electric vehicle comprising:
the power supply device;
a motor for traveling to which electric power is supplied from the power supply device;
a vehicle body on which the power supply device and the motor are mounted; and
wheels driven by the motor to cause the vehicle body to travel.

8. A power storage device including the power supply device according to claim 1, the power storage device comprising:
the power supply device; and
a power supply controller that controls charging and discharging to the power supply device,
wherein the power supply controller enables charging to the secondary battery cell by electric power from an outside, and performs control to charge the secondary battery cell.

* * * * *